Patented Oct. 8, 1940

2,217,170

UNITED STATES PATENT OFFICE 2,217,170

PHONOGRAPH RECORD

James H. Hunter, Lansdowne, Pa., assignor to Radio Corporation of America, a corporation of Delaware No Drawing. Application September 30, 1937, Serial No. 166,645

4 Claims. (Cl. 106—1.5)

This invention relates to phonograph records, and more particularly to a composition of matter especially fit for use in the manufacture of such records.

As is well known in the resin record industry, commercial phonograph records are pressed from the resins, either natural or synthetic, while they are in plastic form, and various fillers and plasticizers are incorporated therein in order to control the consistency thereof and to impart wear resistance to the record. Among the fillers most commonly employed are slate, various clays, certain metal oxides and silicates, etc., all of which are relatively coarse and result in relatively high surface noise when the records in which they are incorporated are played. Also, many of the fillers heretofore employed are comparatively so coarse as to impart to the records which include them relatively short life.

In the past few years, certain vinyl resins have been frequently used in the manufacture of phonograph records. In order to stabilize the resin, small quantities of calcium stearate, lead stearate, or the like have been incorporated therein. These stabilizers are, however, only partially successful, since they tend to impart to the molding compound a somewhat rubber-like texture that causes cold flow and warpage of records made therefrom.

The primary object of my present invention is to provide an improved composition of matter which is suitable for phonograph records and which will be free from the aforementioned and other defects present in prior art records.

More specifically, it is an object of my present invention to provide an improved molding compound from which may be made phonograph records having improved stability, improved surface noise characteristics, and greater life, or wear resistance, than records previously made.

Another object of my present invention is to provide an improved resinous composition for phonograph records which will be economical in cost and in manufacture, which readily lends itself to processing, such as working, pressing and blanking, and which produces a record having excellent characteristics from the standpoints of stability, long life, and fidelity of reproduction.

In accordance with my present invention, I incorporate into the resin molding composition one or more compounds of titanium. I have found that very fine titanium dioxide, when used as a record compound filler, imparts an extremely low surface noise to the finished record and also produces a record with exceptionally long wearing properties. I have also found that lead titanate may not only be used as a filler, but that it acts as an excellent stabilizer in molding compounds made especially from vinyl resins which have been made of polymerized vinyl halides, such as vinyl chloride. Such resins are comparatively easily decomposed by heat, and in the decomposition thereof, where vinyl chloride forms the resin base, hydrochloric acid gas is given off. The hydrochloric acid gas acts as an accelerator and hastens the further decomposition of the resin. Lead titanate, when added to a resin of this type, readily reacts with the hydrochloric acid gas to form insoluble and relatively unreactive lead chloride. In addition to acting as a stabilizer, I have found that it also acts as an excellent filler when used in extremely fine particle size. Large quantities of this material may be used as a filler, and this, of course, enhances its stabilizing value in contrast to calcium stearate and lead stearate, only small quantities of which may be employed because of the plasticizing action of these stearates.

Both titanium dioxide and lead titanate may be readily obtained on the market and, for best results, should be of a particle size of not over approximately one micron in the greatest dimension. Preferably, the particle size should be between 0.1 and 0.5 micron. Any suitable resin may be employed as a base for the record material, such as shellac, phenolic resins, vinyl resins, resins derived from acrylic acid and its derivatives, urea resins, etc., as may any other compositions which becomes plastic under the action of heat, either with or without pressure, such as cellulose acetate or cellulose nitrate. Examples of typical formulas according to my present invention are as follows:

*Formula I*

|  | Pounds |
|---|---|
| Vinyl resin | 90 |
| Titanium dioxide | 61 |
| Carbon black | 25 |
| Calcium stearate | 1 |
| Carnauba wax | 1½ |
| Chlorinated naphthalene | 4½ |

*Formula II*

|  | Pounds |
|---|---|
| Vinyl resin | 90 |
| Titanium dioxide | 50 |
| Lead titanate | 10 |
| Chromium oxide | 5 |
| Carbon black | 25 |
| Calcium stearate | 1 |
| Carnauba wax | 1½ |
| Chlorinated naphthalene | 4½ |

Materials having the above and other similar formulas may be readily compounded on rolls, as used in the production of rubber compounds, for example, or they may be made in a Banbury mixer. I have found that up to 75%, by weight, of titanium dioxide may be used to advantage and that from approximately 1% to over 50%, by weight, of lead titanate may be successfully employed.

It is to be understood that the foregoing formulas are merely illustrative and not limiting either as to the particular ingredients employed, or to the percentages of these materials. Not only can the resin base be varied, but also the specific plasticizers and mold lubricants may be varied. Furthermore, in place of titanium dioxide, other oxides of titanium, such as titanium sesquioxide or titanium peroxide may be employed, and in place of lead titanate, it is possible to employ calcium titanate, magnesium titanate, or the like. These materials may be employed alone as fillers, or, if desired, additional fillers, such as barium sulphate, chromic oxide, iron oxide, calcium carbonate, Sienna filler, or any other suitable fillers may be employed also, depending upon the nature of the resin employed. As a stabilizer, lead titanate may be used alone or together with a small amount of a suitable stearate.

From the foregoing description, it will be apparent to those skilled in the art that I have provided an improved composition of matter for phonograph records which has the advantages heretofore noted. In addition to these advantages, I have also found that records made of this material are much less subject to warpage, even under extreme conditions. These and other advantages can also be realized by many modifications which will, no doubt, readily suggest themselves to those skilled in the art and which fall within the scope of the present invention. I therefore desire that my invention shall not be limited except insofar as is made necessary by the prior art and by the spirit of the appended claims.

I claim as my invention:

1. A composition of matter comprising a vinyl resin having a quantity of lead titanate incorporated therein.

2. A phonograph record comprising a vinyl resin having incorporated therein a quantity of a stabilizer comprising a titanate selected from the group consisting of lead, magnesium, or calcium titanate.

3. A phonograph record comprised of a material having a polymerized vinyl halide base adapted to liberate a halide gas upon being subjected to heat, and a stabilizing agent of a titanium compound adapted to react with said gas.

4. A phonograph record comprised of a material having a polymerized vinyl halide base adapted to liberate a halide gas upon being subjected to heat, and lead titanate as a stabilizing agent for said material.

JAMES H. HUNTER.